March 10, 1942. R. E. CLARKE 2,276,245
MANUFACTURE OF MAGNESIUM PRODUCTS FROM BRINES
Filed Oct. 25, 1938
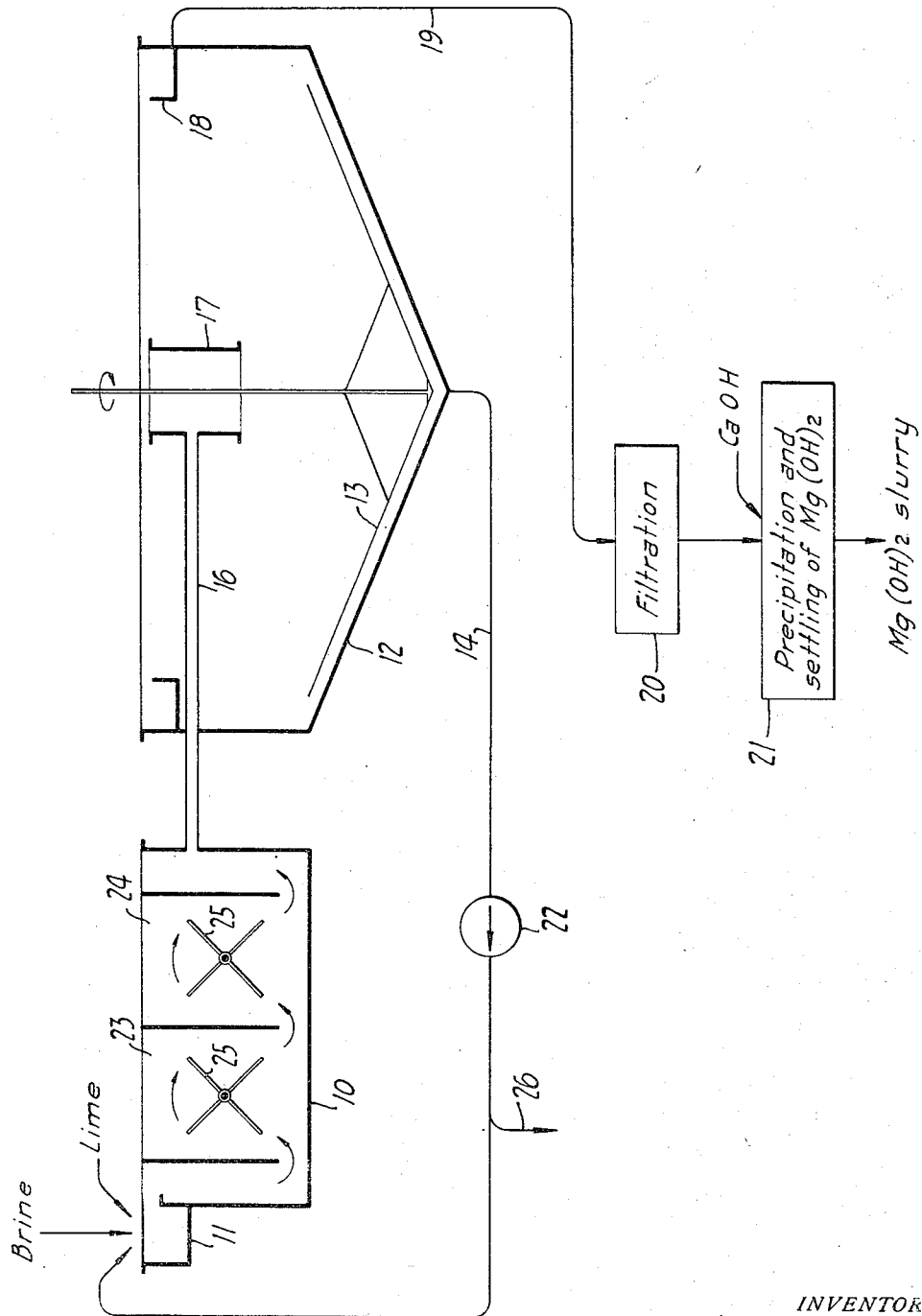
INVENTOR
Robert E. Clarke
BY Paul D. Flehr
ATTORNEY Patented Mar. 10, 1942

2,276,245

UNITED STATES PATENT OFFICE 2,276,245

MANUFACTURE OF MAGNESIUM PRODUCTS FROM BRINES

Robert E. Clarke, Palo Alto, Calif., assignor to Marine Magnesium Products Corporation, South San Francisco, Calif., a corporation of Delaware Application October 25, 1938, Serial No. 236,890

5 Claims. (Cl. 23—201)

This invention relates generally to processes for the manufacture of magnesium hydroxide or other magnesium products from brines containing convertible magnesium salts. More particularly the invention is concerned with the treatment of brines containing a dissolved calcium content as calcium bicarbonate, and where it is desired to produce magnesium products containing a minimum amount of calcium contamination.

Many brines containing available magnesium salts also contain dissolved calcium bicarbonate. While magnesium hydroxide can be readily precipitated from such a brine by reacting the same with calcium hydroxide, or like reagent, unless steps are taken to remove the bicarbonate content prior to the main precipitating operation the calcium content will be largely precipitated as calcium carbonate together with the desired magnesium hydroxide. The practical removal of such calcium carbonate from the magnesium hydroxide precipitate is a difficult if not impossible commercial operation.

It is possible to minimize such line contamination by pre-treatment of the brine with a small amount of lime, for the purpose of precipitating calcium bicarbonate as calcium carbonate in an operation preceding the main precipitating reaction. Such pre-treatment is disclosed in Farnsworth et al. Patent No. 2,021,501, and Chesny Patent No. 2,089,339.

It has been found that pre-treatment of the brine as described above is a difficult operation if it is to be effective to remove calcium bicarbonate, primarily because after the reaction between the lime and the bicarbonate ion the calcium carbonate formed is in highly colloidal state and will not readily precipitate in a solution of sodium chloride to any material extent even after days of retention. A further difficulty is continued contamination by carbon dioxide of the air, particularly where the treatment is prolonged. When brine containing such colloidal calcium carbonate is filtered by suitable equipment, as for example filters containing beds of sand and gravel, the colloidal carbonate deposits upon the sand and gravel to cause a cementing action which in time destroys the effectiveness of the bed, thereby making it necessary to rebuild the filter beds after a comparatively short period of time.

It is an object of the present invention to provide a process of the above character having a simplified and more effective pre-treatment of the brine for the purpose of precipitating calcium bicarbonate as calcium carbonate. Briefly, in the present process completeness of the reaction is greatly accelerated by intimate contact of the brine with an activated material. This material is in the form of a sludge or slurrry which is highly active in promoting precipitation of calcium carbonate.

It is a further object of the invention to afford a process which will effectively reduce fluoride contamination in the precipitated magnesium hydroxide.

Further objects of the invention will appear from the following description in which the preferred embodiment of the invention has been set forth in detail in conjunction with the accompanying drawing.

In describing in detail one procedure for carrying out the present invention, reference will be made to use of sea water as a source of brine containing convertible magnesium salts. Normal sea water has 120 parts per million of dissolved calcium bicarbonate, which upon reacting with an equivalent quantity of calcium hydroxide slurry, provides 240 parts per million of calcium carbonate. In addition to other dissolved salts such as sodium fluoride, sea water contains from 1 to 1.3 parts per million of fluorides. The magnesium salt content is mainly in the form of magnesium chloride, together with a smaller percentage of magnesium sulphate.

As a preliminary treatment the sea water can be subjected to chlorination, by introducing small amounts of chlorine gas directly into the brine, followed by a period of retention. Such chlorination assists in the oxidation and removal of organic matter, and also aids in sterilizing the brine with respect to bacteria or micro-organisms.

The brine is now in condition to be subjected to the pre-treatment operation in which it is reacted with a small amount of lime. The amount of lime or calcium hydroxide employed should be sufficient to theoretically satisfy the bicarbonate ion present, and to precipitate a substantial but minor percentage of the convertible magnesium salts. It is convenient to make use of equipment such as illustrated diagrammatically in the drawing, although other types of equipment known to those skilled in the art can be employed. This equipment consists of a tank 10, having a mixing box 11 into which the brine, together with the activated material and the reacting calcium hydroxide, can be introduced for admixture. The material from tank 10 is permitted to flow into a substantially larger retention tank 12. Above the conical bottom of this tank there is a rake 13, driven at slow speed, to facilitate removal of slurry or sludge settling to the bottom of this tank, by way of line 14.

A suitable arrangement for conveying the flow from tank 10 to tank 12 consists in providing the connecting conduit 16, which discharges into the open bottom well 17 positioned centrally of the tank 12. Tank 12 is provided with an overflow launder 18, and the overflow 19 from this launder, after being clarified by filtration (20) is delivered to the main precipitating operation 21. The sludge or settled slurry removed from tank 12 by way of line 14, is delivered back to the mixing box 11 of tank 10 as by means of a pump 22. Thus this material is intimately mixed with the mixture of sea water and reacting lime slurry, and as will be presently explained it serves to greatly accelerate the desired reaction for precipitation of calcium carbonate.

Parts disposed within tank 10 are arranged to promote formation of flocs of precipitate and sludge particles. Thus the interior of tank 10 is shown provided with a plurality of compartments 23 and 24, each having a slowly rotating paddle wheel 25 disposed within the same. The flow of material tends to be substantially as illustrated by the arrows with final discharge of the mixture through the conduit 16.

The capacity of tanks 10 and 12 may vary in practice depending upon the type of brine employed and the rate with which the brine is supplied to the mixing box 11. In actual practice, using San Francisco Bay water, tanks 10 and 12 have been constructed to have a capacity of 81,000 gals. and 650,000 gals. respectively, with the bay water flowing continuously into mixing box 11 at an average rate of about 800 gals. per minute. The rate at which the sludge is continuously re-circulated by pump 22 may also vary in practice, although in the example stated the rate is about 12 gals. per minute.

Assuming continuous operation of the pre-treatment steps as described above, starting with no slurry or sludge in the tank 12, the sludge will gradually accumulate and become more effective in accelerating precipitation of calcium carbonate. Thus in the example previously stated the effective activity of the sludge in this respect increased gradually over a period of from 10 to 14 days after which time it had a remarkable accelerating action in that substantially all of the calcium bicarbonate was removed, and of the calcium carbonates formed, 80% was precipitated almost instantaneously, that is, without any appreciable time of retention. This is in marked contrast to what occurs without the use of such an activated material in which event initial contact of the lime with the sea water results in precipitation of only about 50% of the calcium carbonate, in the first 60 minutes of the reaction. Without the recirculation of activated material, this would result in the deposition of approximately 700 lbs. of calcium carbonate daily on the sand filters or carried over into the final product.

As indicated above, a relatively large percentage of the calcium bicarbonate is immediately precipitated as calcium carbonate, before any appreciable time of retention. However, during retention in tanks 10 and 12 some further precipitation of calcium carbonate occurs, so that the alkalinity of the primary sea water is reduced from approximately 120 parts per million to below 50 parts per million when delivered to pipe line 19.

After the re-circulated sludge has been built up to about 30% solids, a certain amount (line 26) may be continuously bled from the system. The amount so removed from the system should be substantially equal to the amount of precipitates and solids being continuously introduced into the system, by way of the incoming sea water. It will be evident that the sludge need not be continuously bled from the system, but it may if desired be removed intermittently, as required.

Reference has been made to the absorption of fluorides during the carrying out of the present process. Fluorides are absorbed to a substantial degree by the magnesium hydroxide freshly precipitated during the pre-treatment and also there is some continued absorption of fluorides by magnesium hydroxide in the re-circulated sludge. Thus contact with recirculated activated sludge promotes more effective absorption of fluorides and where a given amount of fluorine absorption is required, this amount of absorption can be gained without precipitation of an undue percentage of the convertible magnesium salts. Absorption of fluorides occurs not only within the tank 10, but also in the settling tank 12.

As a typical example in which the process is carried out with due regard to absorption of fluorides, about 3.50 lbs. of calcium oxide slaked to form a slurry, can be used for the treatment of each 1,000 gallons of brine, assuming that the brine is San Francisco Bay water having a sodium chloride content of about 2.75%. The effective retention time when employing tanks of the order previously specified, is in the neighborhood of about 12 hours. Upon analysis of the final precipitated magnesium hydroxide (on a dry basis) it was found to contain from 0.002 to 0.0025% fluorine.

In practice, I prefer that the amount of lime employed in the pre-treatment operation be adjusted so that from about 10% to 25% of the available convertible magnesium salts are precipitated as magnesium hydroxide. This will afford a sufficient amount of magnesium hydroxide freshly precipitated upon introduction of lime, and present in the sludge, to effectively minimize the fluorine content in the final product. Precipitation of from 12% to 20% of the available convertible magnesium salts in the pre-treatment operation is an optimum range which affords only a slight percentage of fluorine in the final magnesium hydroxide, without too great a sacrifice in available magnesium hydroxide of the original brine. In the foregoing example, making use of about 3.5 pounds of calcium oxide per 1,000 gallons of brine, the amount of lime employed was sufficient to precipitate approximately 15% of the convertible magnesium salts of San Francisco Bay water in the pre-treatment operation.

I claim:

1. In a process for the treatment of brine containing dissolved calcium bicarbonate and convertible magnesium salts, preparatory to precipitating magnesium hydroxide from the treated brine, the steps of reacting the brine with calcium hydroxide, the amount of calcium hydroxide being sufficient to theoretically satisfy the bicarbonate ion present and to precipitate only a minor portion of the magnesium salts, thereby causing precipitation of calcium bicarbonate as calcium carbonate and only a minor portion of the magnesium salts as magnesium hydroxide, and accelerating precipitation of calcium carbonate without further precipitation of magnesium salts by contacting the brine with an activated material, the activated material including material previously precipitated from brine by said reaction with calcium hydroxide, and being substantially free of unreacted calcium hydroxide, the activity of the material having been built up by repeated re-use of the same in the process over a long period of time.

2. In a process for the treatment of brine containing convertible magnesium salts, the steps of mixing calcium hydroxide with the brine, the amount of calcium hydroxide employed being sufficient to theoretically satisfy the bicarbonate ion present and to precipitate only a minor portion of the magnesium salts, thereby causing precipitation of calcium bicarbonate as calcium carbonate and only a minor portion of the magnesium salts as magnesium hydroxide, accelerating reaction between the calcium hydroxide and the bicarbonate ion of the brine to effect precipitation of calcium carbonate without further precipitation of magnesium salts, said last named step being accomplished by contact between the brine and sludge settled from like brine previously treated in a like manner, the sludge being substantially free of unreacted calcium hydroxide, subjecting the brine to storage and retention whereby the precipitated calcium carbonate settles out by gravity for reuse, and then precipitating magnesium hydroxide from the treated brine and separately recovering the precipitate.

3. In a process for the treatment of brine containing both convertible magnesium salts and dissolved calcium bicarbonate, for the effective removal of the dissolved calcium bicarbonate preparatory to separately precipitating magnesium hydroxide from the treated brine, the steps of intimately mixing the brine with calcium hydroxide in an amount sufficient to theoretically satisfy the bicarbonate ions present and to precipitate only a minor portion of the magnesium salts, thereby causing precipitation of calcium bicarbonate as calcium carbonate and only a minor portion of the magnesium salts as magnesium hydroxide, conveying the mixture to a zone of retention and settlement where a sludge containing the precipitated calcium carbonate settles out by gravity, the sludge being substantially free of unreacted calcium hydroxide, and continuously using the sludge settling out in the zone of retention and settlement for mixing with additional brine being supplied to the process, whereby over a period of time the sludge so recirculated attains a high activity in accelerating precipitation of calcium carbonate.

4. In a process for the manufacture of magnesium hydroxide from sea water, the steps of reacting the sea water with calcium hydroxide, the amount of calcium hydroxide being sufficient to theoretically satisfy the bicarbonate ion present and to precipitate only a minor portion of the convertible magnesium salts present, thereby causing precipitation of calcium bicarbonate as calcium carbonate and only a minor portion of the magnesium salts as magnesium hydroxide, accelerating the precipitation of calcium carbonate by contacting the brine with a sludge, said sludge consisting of calcium carbonate and magnesium hydroxide precipitated in a like fashion from sea water by reaction with calcium hydroxide, said sludge being substantially free of unreacted calcium hydroxide, the activity of the sludge in promoting precipitation of calcium carbonate having been built up by continual re-use in the process over a long period of time, and then precipitating magnesium hydroxide from the treated brine and separately recovering the precipitate.

5. In a process for the manufacture of magnesium hydroxide from sea water containing convertible magnesium salts, the steps of reacting the brine with calcium hydroxide to precipitate calcium bicarbonate as calcium carbonate and magnesium salts as magnesium hydroxide, the amount of calcium hydroxide employed being sufficient to theoretically satisfy the bicarbonate ion present and to precipitate only a minor portion of the convertible magnesium salts present, accelerating precipitation of calcium carbonate by causing the brine to be intimately contacted with a sludge, the sludge being substantially free of unreacted calcium hydroxide and consisting of calcium carbonate and magnesium hydroxide precipitated in a like manner from a previously treated quantity of sea water, the activity of the sludge in promoting precipitation of calcium carbonate having been built up by repeated and continual re-use in the process over a long period of time, reacting the brine with calcium hydroxide to precipitate the remaining convertible magnesium salts as magnesium hydroxide, and then separately recovering the precipitated magnesium hydroxide from the brine.

ROBERT E. CLARKE.